United States Patent [19]

Lee et al.

[11] Patent Number: 5,649,000
[45] Date of Patent: Jul. 15, 1997

[54] METHOD AND SYSTEM FOR PROVIDING A DIFFERENT FREQUENCY HANDOFF IN A CDMA CELLULAR TELEPHONE SYSTEM

[75] Inventors: Dong-Wook Lee; Myoung-Jin Kim; Yeoung-Jee Chung, all of Daejeon, Rep. of Korea

[73] Assignee: Electronics & Telecommunications Research Institute, Daejeon-shi, Rep. of Korea

[21] Appl. No.: 354,436

[22] Filed: Dec. 12, 1994

[30] Foreign Application Priority Data

Nov. 16, 1994 [KR] Rep. of Korea ............... 94-30100

[51] Int. Cl.[6] ............................. H04Q 7/22; H04Q 7/24
[52] U.S. Cl. ......................... 455/436; 375/200; 370/331
[58] Field of Search ..................... 379/59, 60; 455/33.1, 455/33.2; 375/200, 202, 203, 205

[56] References Cited

U.S. PATENT DOCUMENTS 5,101,501  3/1992  Gilhousen et al. ............... 455/33
5,103,459  4/1992  Gilhousen et al. .

Primary Examiner—William Cumming
Assistant Examiner—Nay Maung
Attorney, Agent, or Firm—Antonelli, Terry, Stout & Kraus, LLP

[57] ABSTRACT

A cellular system transfers a call from a source base station to the target base station. A mobile unit measures the strength of pilot signals emanating from surrounding base stations. In response to the result of the measurement, a different frequency hand off operation is initiated by the mobile unit when all pilot signals are lower than a threshold or is initiated by a system controller with consideration being given to the frequency band occupation state of surrounding base stations and the strength information reported from the mobile unit. In a handoff operation, the mobile unit reduces a maximum data rate to modulate user information with a current used frequency and to modulate a different frequency preposition code with a primary frequency so that neighboring base stations may measure the intensity of the preposition code and the system controller can determine how the different frequency hand-off should be operated.

4 Claims, 5 Drawing Sheets

METHOD AND SYSTEM FOR PROVIDING A DIFFERENT FREQUENCY HANDOFF IN A CDMA CELLULAR TELEPHONE SYSTEM

BACKGROUND OF THE INVENTION

1. Field of the Invention

The invention relates to a communication of information between cell-site stations and mobile units in a Code Division Multiple Access (CDMA) cellular system, more particularly to a method and apparatus for providing a CDMA-to-CDMA different frequency hand-off in a CDMA cellular telephone system when a mobile station travelling in several service regions requires a hand-off from a source cell-site to a target cell-site which is using a frequency band different from that of the source cell-site.

2. Description of the Prior Art

In the conventional cellular mobile telephone system, the cellular service area is divided into several sub-areas, each sub-area being provided with base stations (also known as cell-site stations or cell-sites or for short cells) for controlling cellular services so that a large number of mobile units, e.g. car telephone or cellular telephone, may be serviced with radio communication. In this case, the cellular telephone system requires a number of channels in order to provide radio communication services for a large number of mobile telephone system users, and Code Division Multiple Access and Time Division Multiple Access are typical of such channel securing techniques.

However, as the case may be, in order to accommodate multichannel or to improve the capacity of overall system it is necessary to design a cellular telephone system using the Frequency Division Multiple Access technique. The use of FDMA results in a base station using a particular frequency band which is not assigned to other surrounding base stations.

A hand-off of a mobile telephone in a CDMA system is disclosed in U.S. Pat. No. 5,101,501, entitled "METHOD AND SYSTEM FOR PROVIDING A SOFT HANDOFF IN COMMUNICATION IN A CDMA CELLULAR TELEPHONE SYSTEM" and "CDMA digital CAI Standard—CELLULAR SYSTEM DUAL-MODE MOBILE STATION—BASE STATION COMPATIBILITY STANDARD, DRAFT REVISION 1.0" published on Oct. 1, 1990.

In the above mentioned US patent, a cellular telephone system using a soft hand-off scheme (a make-before-break switching (function) is proposed which is suitable for use in such a case that two neighboring cell-sites use the same frequency band. The soft hand-off from one cell to another is initiated when the mobile receiver recognizes that the received pilot signal strength from the cell-site receiver handling a call falls below a predetermined threshold value. During the hand-off, a mobile unit receives user information emanating from two base stations, and achieves better receiving sensitivity by multi path diversity combining and after then switches the channel from one base station to the other station to complete the hand-off operation. But a CDMA cellular telephone system which includes a FDMA scheme can not carry out a hand-off operation of the mobile unit using such a soft hand-off, because if a base station to which a mobile unit is going to switch or hand-off does not use the same frequency that the mobile unit currently uses, this mobile unit can not receive any information from the base station to be handed-off.

In the above cited CAI standard, two approaches for solving possible problems of a different frequency hand-off scheme in the CDMA cellular telephone system are recommended. The one approach adopts a method in which a home cell-site presently servicing the call instructs the mobile unit to hand-off in response to the frequency occupation state used by neighboring cell-sites and the distance between the home cell-site and the mobile telephone unit. But this method has some disadvantages in that in a certain direction along which the mobile unit moves, an undesirable hand-off may occur because the influence of the intensity of the propagation signal is not taken into consideration as the distance between the cell-site and mobile unit is the only decision parameter for determining if the hand-off is initiated or not. Moreover, the hand-off operation may not be accomplished even in a situation when hand-off is required to be initiated.

On the other hand, in the second approach recommended in the above CAI standard, neighboring cell-sites continuously transmit pilot signals through a frequency channel used by the cell-site presently providing service, but this approach does not communicate user information through the frequency channel. As a result, a hand-off is determined by the same method as the soft hand-off proposed in the above U.S. Pat. No. 5,101,501, and a different frequency hand-off instruction can be issued to the mobile unit in response to the hand-off determination and the frequency usage state of neighboring cell-sites. But unfortunately, additional communication equipment is necessary to realize this method which is too expensive, because most of all the equipment contained in the system needs to be used even in transmitting the pilot signal.

As apparent from the above discussion, the conventional prior art methods are not appropriate in design for use with a CDMA cellular telephone system which includes FDMA for improving the overall capacity of the system.

SUMMARY OF THE INVENTION

Accordingly, the object of the present invention is to provide a method and an apparatus for providing a CDMA-to-CDMA different frequency hand-off for a mobile system user moving from one base station to another in CDMA cellular system by employing a additional equipment and by taking the intensity of propagation signals into consideration in a different frequency hand off.

To accomplish the object, the present invention is characterized in that, at a mobile system user side a controller determines if a hand off is to be initiated based upon the strength of pilot signals received from proximal base stations and controlling a data positioning device for setting a data transfer rate and a transmission position of user information data which is to be transferred to a base station and for inserting a different frequency handoff preposition code into user information in a hand-off mode of operation, and a frequency synthesizer which, in the hand-off mode of operation modulates user information with a frequency being used between the mobile system user and the base station and in the normal mode of operation modulates the different frequency preposition code with a primary frequency.

Further, to accomplish the object of the invention, the base station comprises an analog receiver for receiving user information data from the mobile user via a plurality of antennas and down-converting the received data, and a channel control processor 90 for.

In accordance with the preferred embodiment of the present invention, a system controller has means for, upon receiving a hand-off request from a mobile unit via a source cell-site selecting a target cell-site and cutting off a call between the mobile unit and proximal cell-sites except the target cell-site.

According to this invention, in a CDMA cellular telephone communication system, a method for achieving hand-off between the source cell-site and the target cell-site includes the steps of:

A) comparing, at the mobile unit, the strength of the pilot signals received from the source cell-site and its neighbor cell-sites with a threshold values;

B) sending, at the mobile unit, a different frequency hand off request to the system controller via said source cell-site when the intensities of all pilot signals are weaker than the threshold, said hand off request containing strength information of pilot signals emanating from the cell-sites;

C) sending, at the system controller, a different frequency hand off acknowledgement to the mobile unit via the source cell-site said acknowledgement containing an instruction about a different frequency hand off;

D) sending, at the system controller, a mobile unit assignment to proximal cell-sites within a predetermined range;

E) modulating and transmitting, at the mobile unit, user information and a different frequency hand off preposition code with said different frequency and a primary frequency, respectively;

F) sending, at the proximal cell-sites, an information message of the strength of the preposition code to the system controller, said information message containing energy information of said preposition code;

G) selecting, at the system controller, the target cell-site based upon said strength information and transferring a hand off grant to the mobile unit via the source cell-site, said hand off grant containing information about the selected target cell-site;

H) transferring, at the mobile unit, communication from the source cell-site to the selected target cell-site;

I) sending, at the mobile unit, a hand off end message to the system controller via said target cell-site;

J) sending, at the system controller, a clear message to drop call service to all but said target cell-site.

DETAILED DESCRIPTION OF THE PREFERRED EMBODIMENTS

Figure 1:
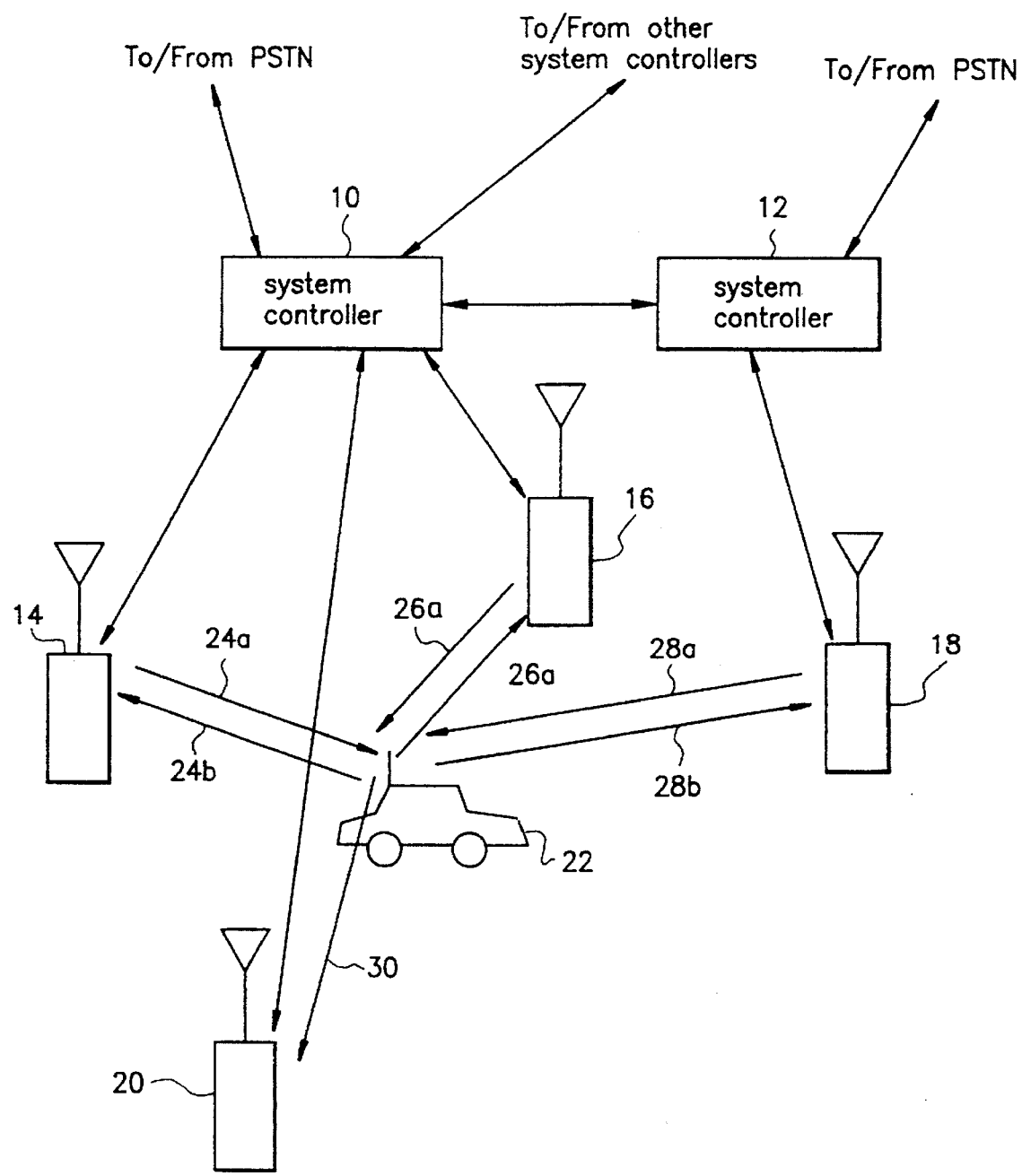
FIG. 1 is a schematic overview of an CDMA cellular telephone system applicable to the present invention.

FIG. 1 illustrates a CDMA cellular telephone system which can employ the present invention. In order to apply a different frequency hand-off scheme according to the invention, first of all phase-only different signals, i.e. pilot signals have to be generated from each cell-site which services cellular RF communication. Typically, the pilot signal or carrier is used by the mobile telephone units to obtain initial system synchronization and to provide robust time, frequency and phase tracking of the cell-site transmitted signals. Each cell-site also transmits spread spectrum modulated information, such as cell-site identification, system timing, mobile paging information and various other control signals.

In FIG. 1, a mobile unit 22, which is located nearest to one cell-site 14 of a plurality of cells (here-in-after referred to as the first cell-site), identifies the strongest pilot signal among pilot signals transmitted from the cell-sites when the mobile unit starts up its operation. The pilot signals, each use one particular PN (Pnseudo-Noise) code identical for every cell with the exception of the phase and are readily identifiable for all cell-sites by the mobile unit 22.

First, the mobile unit 22 measures the intensity of pilot signals for one frequency band, i.e. the primary frequency. If the mobile unit 22 determines that the pilot signal transmitted from the first cell-site 14 is strongest in the procedure of the measurement preformed by the unit 22, the mobile unit 22 receives system information of the cell-site 14 using the strongest pilot signal.

From the system information the unit 22 finds out a certain communication frequency being used by the first cell-site 14, and is tuned to a certain frequency so as to make the mobile units uniformly distributed in a respective frequency band of the first cell-site 14 through a predetermined algorithm (which will be explained in detail in FIG. 3). The mobile unit 22 receives information from the nearest cell-site 14 in the direction of arrow 24a, and transmits its own information in the direction of arrow 24b via a certain communication frequency. The first cell-site 14 is connected to a cellular system controller 10 in a user information exchange operation, and the system controller 10 may be connected to either another cellular system controller 12 or to the PSTN (Public Switched Telephone Network). Other cell-sites 16, 18, 20 connected to cellular control systems 10,12 are also using only the primary frequency. When the mobile unit 22 begins to move to one of the other cell-sites 16,18,20 from the first cell 14, it is required to initiate a different frequency hand-off.

This hand-off can be classified into two kinds; hand-off to the second cell-site 16 which is connected to the same cellular control system 10 as the first cell 14, and hand-off to the third cell-site 18 which connected to another control system 12 different from the system controller the first cell 14.

Figure 2:
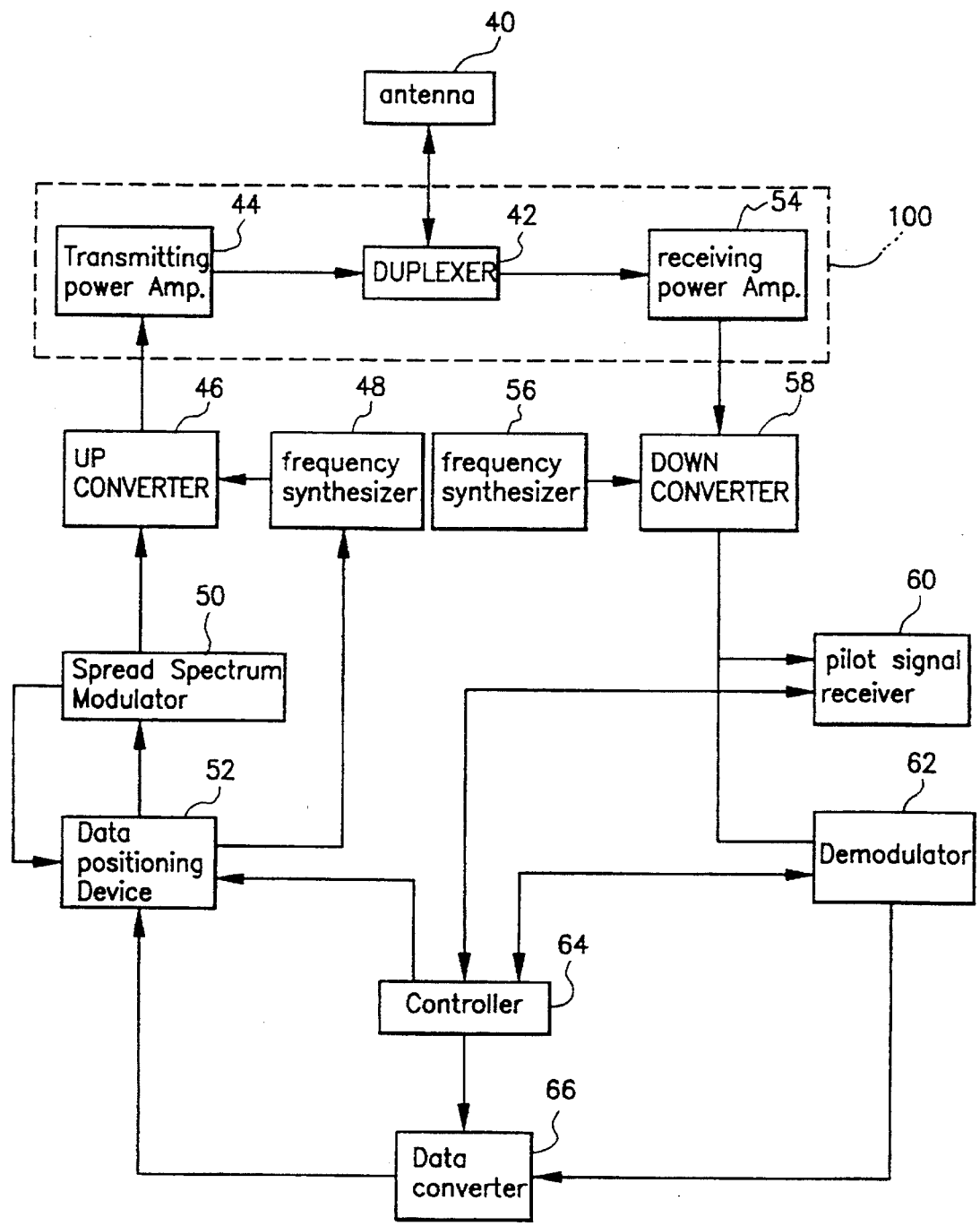
FIG. 2 is a block diagram of a mobile unit according to the present invention for supporting a different frequency hand-off in CDMA cellular telephone system.

In order to provide this two kinds of hand-off, the mobile unit and the cell-site according to the present invention utilize the system described herein-after in FIG. 2.

FIG. 2 shows a schematic block diagram of the mobile unit for providing a different frequency hand-off in the CDMA cellular system. Included within the mobile unit are a data transceiver 100, a digital data demodulator 62, a data converter 66, a data positioning device 52, an up converter 46, frequency synthesizers 48 and 56, and a controller 64.

The data transmitter and receiver 100 transmits and receives radio data through an antenna 40. The received radio data is down converted in a down converter 58. The down converted output of the down converter 58 is a inputted into a pilot receiver 60 and a demodulator 62. The pilot receiver 60 accomplishes the operation of acquiring PN code of pilot signals emanating from respective cell-sites, measures the strength of the pilot signals, and reports the measurement of strength and PN code phases of the pilot signals to the controller 64. From this information, the controller 64 determines if the mobile unit initiates a handoff. The digital data de-modulator 62 demodulates the output of the down converter. The demodulator 62 might perform rake receiving in response to a control of the controller 64. Data converter 66 is adapted to change the demodulated output from the demodulator 62 to user information and to change the user information to digital data under the control signal. A data positioning device 52 is used for forming a single data frame from the output digital data of the data converter 66 in response to the control signal. The data positioning device 52 inserts the different frequency handoff preposition code into the data frame when the controller 64 determines initiating the different frequency handoff. The details of the data positioning device 52 will be described later.

An up-converter 46 can be used for modulating the modulated spread spectrum signal with corresponding transmission frequency of the mobile unit, and for supplying its output signal to the data transmitter and receiver 100.

In addition to the above mentioned components, a first and a second local oscillator frequency synthesizer 48,56 provide modulation and demodulation of the received signal frequency and the signal frequency to be transmitted via the down converter 58 and the up-converter 46 respectively and may be contained in the mobile unit.

The operation of the mobile unit employing the principles of the invention is explained as follows.

The main feature of the pilot signal transmitted from each cell-site is that the pilot signal uses a single dedicated PN code but having a different phase for each cell-site. The pilot signal receiver 60, therefore, can measure the intensity of all pilot signals by acquiring the PN code. The measured pilot signal's intensity value is, then supplied to the controller 64 which identifies the cell-sites whose pilot signal is stronger than others. The digital data demodulator 62 is synchronized to the frequency of the identified cell-site.

After receiving system information of the cell-site and establishing service of the call by synchronizing the digital data demodulator 62, the controller 64 makes user information to be demodulated and generates user digital data through the data converter 66. The controller 64 then compares the received pilot signal intensity with a predetermined threshold so as to determine if a different frequency hand-off is necessary.

When the intensities of all pilot signals are weaker than the threshold, the controller 64 determines that a different frequency hand-off is to be initiated and sends a hand-off request to the system controller 10 (referring to FIG. 1) to request a different frequency handoff.

The user information emanating from cell-sites to mobile units has, for example a frame of 20 msec. length. Each frame has power control groups (PCGs) of 1.25 msec. The cell-sites transmit PCG with embedded control bits in order to control the transmission power of the mobile unit, in which the power control bits are used for ordering each mobile unit to increase or decrease its power.

For this reason, data to be transferred to mobile units from cell-sites should be transmitted continuously. A frame of higher data rate is, therefore, transmitted with higher power, while a frame of lower data rate is transmitted with lower power. In other words, data having a low data transfer rate will be repeatedly transmitted as many times as (maximum data rate)/(lower data rate), but the power will be decreased for the lower data rate.

However, for data to be transferred to cell-sites from mobile units (whose direction is opposite to that of the above-mentioned situation) the pilot signal can not transmitted together with data. As a result, data of a lower data rate should be transmitted with decreased power by the square root of (lower data rate)/(maximum data rate) for applying the above method. So, it is preferable, instead of decreasing the transmission power for data of the data rate, to transmit data with equal transmission power regardless of what the data rate is, and to transmit data with data frames filled with data as often as lower data rate/maximum data rate. The operation of data filling is performed by the data positioning device 52, on the PCG unit.

The data positioning device 52 in addition to this data filling operation, performs an operation of filling a different frequency handoff preposition code into the portion of frame in which data is not yet filled in the different frequency handoff mode. The resultant data from the preposition code filling operation is modulated into a direct-sequence spread spectrum signal in the spread spectrum modulator 50 and is transmitted after being modulated with a corresponding frequency in the up-converter 46.

In this case, while the first local oscillator frequency synthesizer 48 in its normal operation mode may synthesize a frequency band in which the mobile unit can communicate user information with that of the cell-site presently handling the call of this mobile unit, in the different frequency handoff operation caused by the above mentioned conditions, the frequency synthesizer 48 receives data position information from the positioning device 52 either to operate in the normal mode during the period of data transmission or to generate a primary frequency during the period of transmission of the different frequency preposition code.

Now, will be explained in detail the preferred embodiment of the positioning device 52 within the mobile telephone unit of the present invention with reference to FIG. 3.

FIGS. 3A–3E are exemplary diagrams suitable for explaining the algorithm of a data group randominizer used in the CDMA cellular telephone system. Referring to FIGS. 3A–3E, the position of data group within a single frame is illustrated, which position is determined from constant position of a PN code sequence used in transmission of a previous frame.

It should be noted that in the location of the transmission of ⅛ rate data (referring to FIG. 3D), data of every rate are always present, while in the location of ¼ rate data transmission (referring to FIG. 3C) data of full-rate and ½ rate are present all the time. This means that in a location having no data of the ½ rate there must be no data of ¼ rate and ⅛ rate.

Designed upon this property the positioning device 52 within the mobile unit of the present invention in its operating state has characteristic feature as follows. The maximum data rate of user information data is lowered to the ½ rate and makes the data rate of different frequency handoff preposition code constant, i.e. ½ rate (referring to FIG. 3E).

In FIGS. 3A–3E, assuming frame and has the value of 1 or 0, the PCGs occupied by the the full rate is 0,1,2,3,4,5, 6,7,8,9,10,11,12, 13,14,15, the PCGs occupied by the data burst at the half rate are b0, 2+b1, 4+b2, 6+b3, 8+b4, 10+b5, 12+b6, 14+b7, and the PCGs not occupied by the data burst at ½ rate is b0', 2+b1', 4+b2', 6+b3', 8+b4', 10+b5', 12+b6', 14+b7' in which b'n is a logic NOT of bn.

Figure 3A:
FIGS. 3A–3E are exemplary views of algorithms suitable for explaining the algorithm of a data group randominizer used in CDMA cellular system.
Figure 3B:
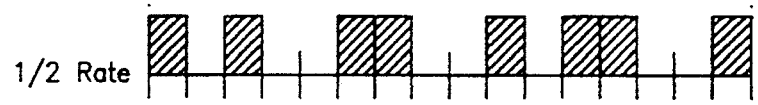
Figure 3C:
Figure 3D:
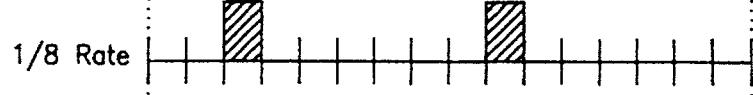
Figure 3E:
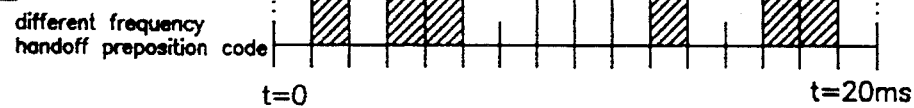

By placing the different frequency handoff preposition code in this location i.e. b0', 2+b1', 4+b2', 6+b3', 8+b4', 10+b5', 12+b6', 14+b7' which are shown low level in FIG. 3B, the collision with data which may be transmitted at ¼ rate (FIG. 3C) or at ⅛ rate (FIG. 3D) can be prevented. As result, the positioning device 52 can transmit both user information data and different frequency preposition code with corresponding different frequency band by controlling the first frequency synthesizer 48.

A cell-site is explained with reference to FIG. 4. In this discussion, the cell-site is suitable for receiving user information data and a different frequency handoff preposition code in responding to the mobile unit which is, as explained with reference to FIG. 2 and 3, suitable for providing different frequency handoff operation of the present invention.

Figure 4:
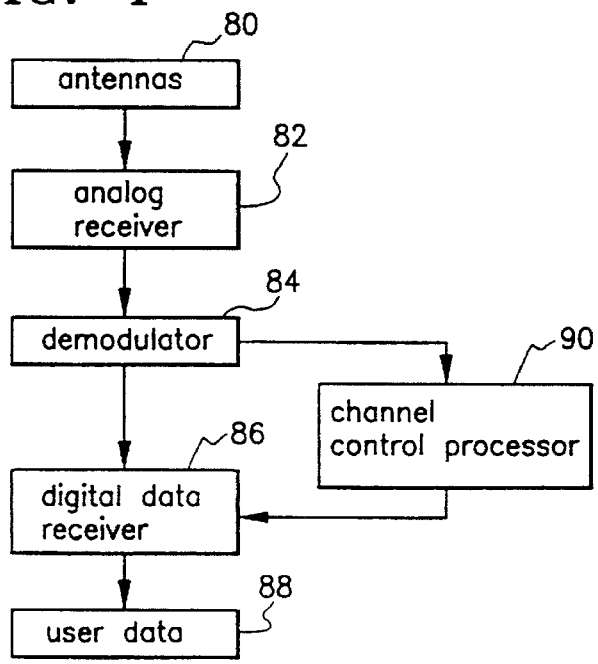
FIG. 4 is a block diagram of a cell-site receiver device for providing a different frequency hand off operation according to the present invention in the CDMA cellular telephone system.

FIG. 4 is a block diagram of a cell-site receiver device for providing a different frequency handoff operation according to the present invention in the CDMA cellular telephone system. The cell-site receiver device comprises an analog receiver 82 for down converting received signals through a plurality of antennas 80, a spread spectrum de-spreader 84 for converting into a digital data the spread spectrum signal supplied from the analog receiver 82, a digital data receiver 86 for receiving digital data converted by the de-spreader 84 and for detecting user information data and a channel control processor 90 for controlling the digital data receiver 86.

In the cell-site receiver device constructed as described above, the cell-site channel control processor 90 notifies the digital data receiver 86 of the received location of the different frequency hand off preposition code if a mobile unit which is a destination of the different frequency hand-off operation is assigned to the present cell-site receiver device by the system controller. If the mobile unit is a destination of the new paging process, the processor 90 notifies the digital data receiver 86 of the received location of data.

The methods for determining and accomplishing the different frequency hand off with a plurality of components of the cell-site and the mobile unit constructed and operated in such a way as described here-in before may be sorted out into two kinds; a hand-off to another base station belonging to the same cellular system controller, and a hand-off to a base station belonging to the different system controller. For each method, a different frequency hand off may be determined by either a mobile unit or cellular control system.

Figure 5:
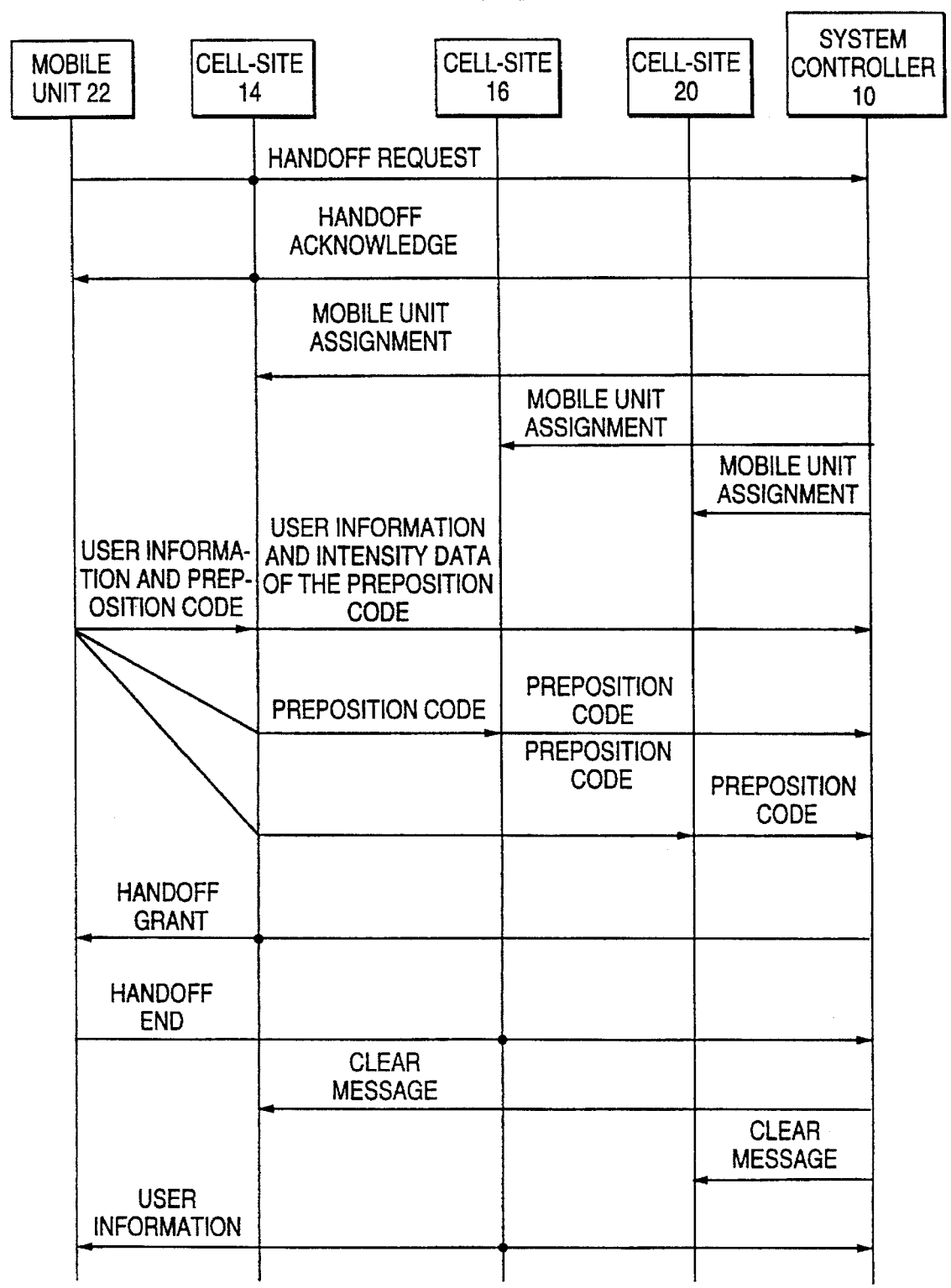
FIGS. 5 and 6 illustrate exemplary embodiments of two kinds of hand-off methods according to the present invention.
Figure 6:
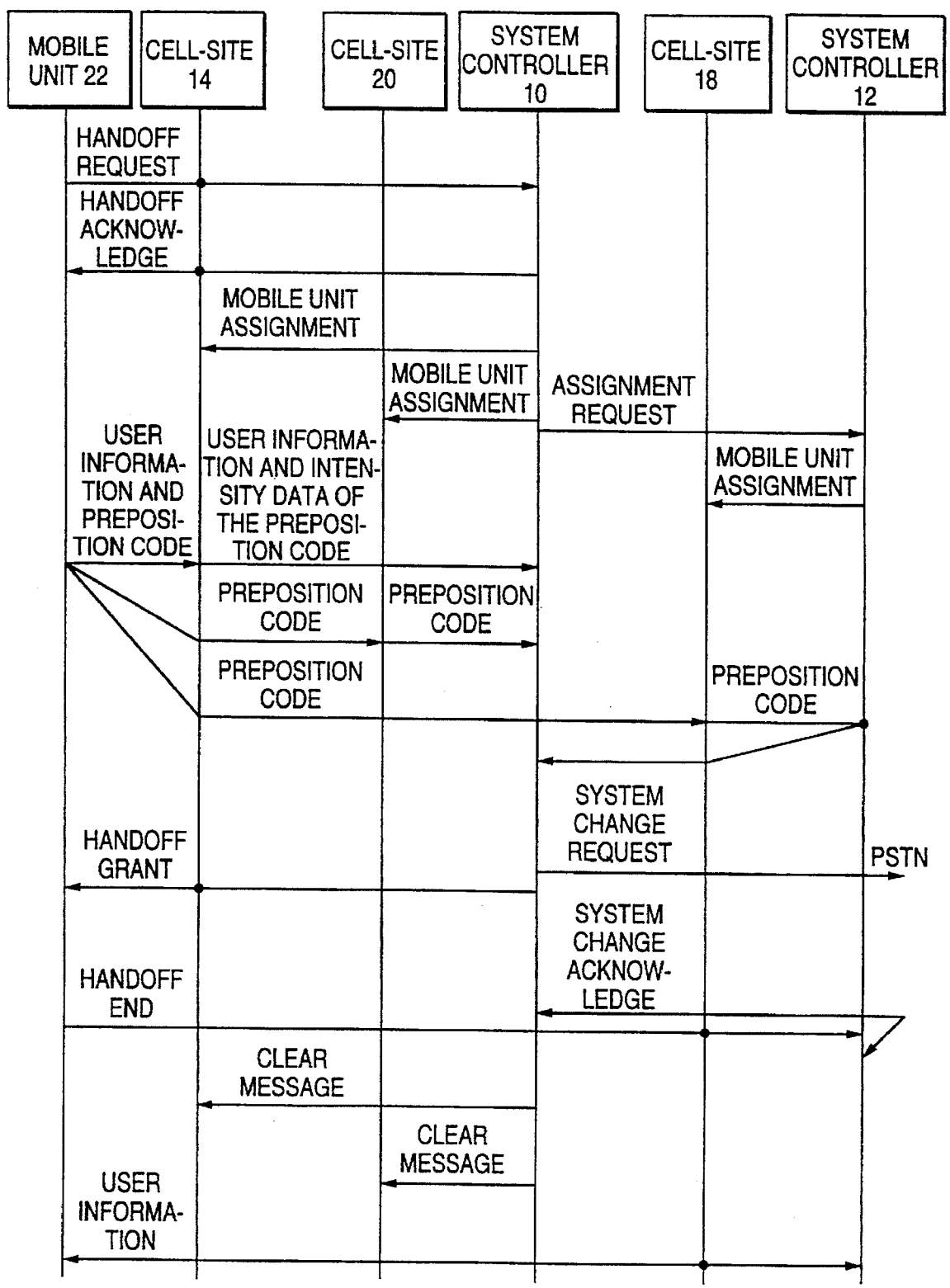

FIGS. 5 and 6 are exemplary embodiments of the two kinds of hand-off methods, in this case a hand off being determined by the system controller.

FIG. 5 illustrates a procedure of a different frequency hand off operation in which a mobile unit is to hand off to the another base station controlled by the same cellular system. A mobile unit 22 give and takes user information of the first cell-site 14 through a certain frequency channel different from the primary frequency, and continuously compares the intensity value of the pilot signal from the cell 14 against a predetermined threshold value.

When the pilot signal receiver 60 within the mobile unit determines that all the intensity values are lower than the threshold value, the controller 64 sends a different frequency hand off request to the cellular control system 10 via the first cell-site 14. In response to the hand off request, the cellular control system 10 seeks a appropriate cell-site to be handed-off. The system controller 10 issues a hand off acknowledgement to the mobile unit 22 via the first cell-site 14. In this case, it is assumed that the cell-site 14 is the nearest cell to the mobile unit 22, and that the hand off acknowledgement includes an instruction ordering the mobile unit 22 to initiate the operation of a different frequency hand-off. As previously mentioned, the distances between a mobile unit and cell-sites are defined upon the strengths of pilot signals from cell-sites.

The system controller 10 further issues a mobile unit assignment message to the cell-site 14 and the neighboring cell-sites 16 and 20 in a reasonable range around the first cell-site 14. The mobile unit designated by the assignment message is the mobile unit which sends a hand-off request. The mobile unit 22 modulates user information and a different frequency hand-off preposition code with a primary frequency and the frequency being used in communication with the first cell-site 14 and then transmits them. The cell-sites 14, 16 and 20 within the reasonable range transmit to the system controller 10 the intensity information of the preposition code including the energy information. Upon this intensity information, the system controller 10 determines that which cell-site is suitable for hand off, and sends to the mobile unit 22 via the first cell-site 14 a hand-off grant containing information about the selected cell-site, for example the cell-site 16. According to the content of the hand-off grant message, the mobile unit 22 changes its communication channel to the second cell-site 16, communicates only user information with the user 16 via the second cell-site.

Upon completing the hand-off, the mobile unit 22 sends a hand off end message to the system controller 10 via the second cell-site 16, and the system controller 10 sends a clear message to break off the call to the cell-sites 14 and 20 which have issued mobile unit assignment messages but not to the second cell-site 16.

FIG. 6 represents an other embodiment of the present invention. In this embodiment the mobile unit is to hand a call off from any cell-site to another cell-site which is allocated to different coverage area (that is, which is controlled by different cellular system controller). When a previous hand off has already been determined by the first system controller 10, and when there has been a cell-site 18 covered by the other, second system controller 12 in a plurality of proximal cell-sites, the first system controller 10 sends to the second system controller 12 a mobile unit assignment request message ordering the controller 12 to transmit for the cell-site 18 and the mobile unit assignment message for the different frequency hand-off operation.

At this time the second system controller 12 sends the assignment message to the corresponding cell-site 18. The cell-site 18 transfers the strength value of the hand off preposition code to the second system controller 12. Upon receiving the strength value, the second controller 12 hands over it the first controller 10. The cellular system controller 10 determines which cell-site is suitable for the hand off operation upon the received strength value. If the result of the determination is the third cell-site 18, the system controller 10 sends a system change request to the third 18 via a PSTN, and sends a hand off grant to the mobile unit 22 through the first cell-site 14.

In response to this system change request, the cellular system controller 10 receives a system change request acknowledgement message from the PSTN. The cellular controller 10, then, sends a clear message to the cell-sites 14 and 20 which have been received the mobile unit assignment message for the different frequency hand off.

As the previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus the present invention is not intended to the embodiments herein, but is to be accorded the widest scope consistent with the principles as novel features discussed herein.

What we claim is:

1. A CDMA cellular telephone communication system having a mobile unit communicating to a source cell-site, a system controller for directing communications between said mobile unit and said cell-site, wherein the mobile unit requires a communication transfer from the source cell-site to a target cell-site selected from a number of proximal cell-sites, said source cell-site communicating user information with said mobile unit through a predetermined frequency channel different from a primary frequency channel, said proximal cell-sites not using said predetermined frequency channel, said communication system comprising:

control means, at the mobile unit, for determining if the mobile unit is to initiate a different frequency handoff based upon a comparison of intensity of pilot signals received from said source cell-site and said proximal cell-sites with a threshold value, for limiting a user data rate, and for controlling a data positioning device and a frequency synthesizer to operate in the different frequency handoff;

means, at the mobile unit, for deciding a transmitting position of said user information data to be transferred to said source cell-site and a different frequency handoff preposition code under control of the control means;

means, at the mobile unit, for modulating the data and said different frequency handoff preposition code with different frequencies;

means, at the cell-site, for demodulating said user information data if the cell site is in a normal mode or measuring intensity of said different frequency handoff preposition code if the cell site is in the different frequency handoff mode from said mobile unit;

channel control means, at the cell-site, for notifying said means for demodulating a receiving position of received data or for measuring intensity of a different frequency preposition code;

means, at the system controller, for receiving the different frequency handoff request from said mobile unit, determining the different frequency handoff, controlling said source cell-site and the cell-sites in a range around said source cell-site to measure the intensity of the received different frequency handoff preposition code, selecting the target cell-site on a basis of measurements of said intensities from said cell-sites, and cutting off a call between the mobile unit and the proximal cell-sites except the target cell-site when in said handoff mode.

2. The communication system of claim 1, wherein:

said control means, upon determining said different frequency handoff, reduces a maximum data rate and commands a data transceiver means to operate in a different frequency handoff mode, whereas if the handoff is withdrawn or the handoff is over said control means recovers to a previous maximum data rate and commands said data transceiver to operate in a normal mode.

3. The communication system of claim 1, wherein:

the mobile unit further comprises a local oscillator frequency synthesizer, means for inserting in a different frequency handoff mode a different frequency handoff preposition code into said user information, for regulating said local oscillator frequency synthesizer for modulating said user information with said predetermined frequency and modulating said preposition code with the primary frequency or in the normal mode said synthesizer for modulating only said user information with the predetermined frequency.

4. In a CDMA cellular telephone communication system having a mobile unit communicating to a source cell-site, a system controller for controlling a different frequency handoff between proximal cell-sites, wherein said mobile unit requires a communication transfer from the source cell-site to a target cell-site selected from a number of said proximal cell-sites, said source cell-site communicating user information with said mobile unit through a predetermined frequency channel different from a primary frequency channel, said proximal cell-sites not using said predetermined frequency channel, and said target cell-site being controlled by the system controller as the source cell-site, a method for achieving handoff between the source cell-site and the target cell-site including the steps of:

A) comparing, at said mobile unit, strengths of pilot signals received from said source cell-site and said proximal cell sites with a threshold value;

B) sending, at the mobile unit, a different frequency handoff request to the system controller via said source cell-site when the strength of all the pilot signals are lower than the threshold value, said different frequency handoff request containing strength information of pilot signals emanating from the proximal cell-sites;

C) sending, at the system controller, a handoff acknowledgement to said mobile unit via the source cell-site when the system controller can not find a proper target cell-site which is using said predetermined frequency channel, said acknowledgement containing an instruction about a different frequency handoff;

D) sending, at the system controller, a mobile unit assignment to the proximal cell-sites within a predetermined range;

E) modulating and transmitting, at the mobile unit, user information and a different frequency handoff preposition code with said predetermined frequency and said primary frequency in a different time slot, respectively;

F) sending, at the proximal cell-sites within a range, an information message of a strength of the preposition code to the system controller, said information message containing information of energy in said preposition code;

G) selecting, at the system controller, the target cell-site based upon said strength, and transferring a different frequency handoff grant to said mobile unit via the source cell-site wherein the handoff grant contains information on a frequency which said mobile unit will use to communicate with said target cell-site, and, said different frequency handoff grant containing information for the selected target cell-site;

H) transferring, at the mobile unit, communications from the source cell-site to the selected target cell-site using the frequency which is contained in said different, handoff frequency and modulating and transmitting at said mobile unit only user information;

I) sending, at the mobile unit, a handoff end message to the system controller via said target cell-site;

J) sending, at the system controller, a clear message to drop call service to all proximal cell-sites but said target cell-site; and K) sending, at said controller, a mode change message for said target cell-site to demodulate said user information instead of message strength of said different frequency handoff preposition code.

* * * * *